United States Patent
Salmela et al.

(10) Patent No.: US 10,827,430 B2
(45) Date of Patent: Nov. 3, 2020

(54) SIGNALING FOR CONTROLLING POWER USAGE IN RADIO ACCESS NETWORKS

(71) Applicant: Nokia Solutions and Networks Oy, Espoo (FI)

(72) Inventors: Olli Salmela, Helsinki (FI); Harri Holma, Helsinki (FI); Andres Arjona, Tokyo (JP)

(73) Assignee: Nokia Solutions And Networks Oy, Espoo (FI)

( * ) Notice: Subject to any disclaimer, the term of this patent is extended or adjusted under 35 U.S.C. 154(b) by 0 days.

(21) Appl. No.: 16/439,832

(22) Filed: Jun. 13, 2019

(65) Prior Publication Data

US 2019/0387471 A1    Dec. 19, 2019

Related U.S. Application Data

(60) Provisional application No. 62/685,520, filed on Jun. 15, 2018.

(51) Int. Cl.
   *H04W 52/02*    (2009.01)

(52) U.S. Cl.
   CPC ... *H04W 52/0229* (2013.01); *H04W 52/0248* (2013.01)

(58) Field of Classification Search
   CPC ............ H04W 88/085; H04W 24/02; H04W 52/0206; H04B 1/0475; H04B 2001/0425
   See application file for complete search history.

(56) References Cited

U.S. PATENT DOCUMENTS

| | | | | |
|---|---|---|---|---|
| 2015/0163684 A1* | 6/2015 | Unno | ............ | H04W 24/02 455/418 |
| 2015/0237578 A1* | 8/2015 | Gogate | ............ | H04W 52/029 370/311 |
| 2019/0289497 A1* | 9/2019 | Rajagopal | ............ | H04B 7/0456 |
| 2019/0357295 A1* | 11/2019 | Kim | ............ | H04L 5/0055 |

OTHER PUBLICATIONS

ECPRI Specification V1.1, Jan. 10, 2018, pp. 1-61 (Year: 2018).*
Extended European Search Report received for corresponding European Patent Application No. 19176076.8, dated Aug. 21, 2019, 6 pages.
Garyantes, "xRAN Fronthaul Working Group Control, User and Synchronization Plane Specification", XRAN-FH. CUS.O-v01.00, 2018, pp. 1-61.
"Common Public Radio Interface: eCPRI Interface Specification", eCPRI Specification V1 .1, Jan. 10, 2018, pp. 1-62.

(Continued)

*Primary Examiner* — Jung H Park
(74) *Attorney, Agent, or Firm* — Harrington & Smith

(57) ABSTRACT

Systems, apparatuses, and methods are described for controlling power usage in radio access networks. A central unit may be configured to receive, from an element management system, one or more first messages indicating power saving policies. The central unit may determine, based on the power saving policies, an idle period, and may send, to a distributed unit, a second message indicating the idle period. The distributed unit may activate, for the idle period, a power saving mode of the distributed unit.

19 Claims, 9 Drawing Sheets

(56) References Cited

OTHER PUBLICATIONS

"3rd Generation Partnership Project; Technical Specification Group Services and System Aspects; Telecommunication management; Energy Saving Management (ESM); Concepts and requirements (Release 14)", 3GPP TS 32.551 V14.0.0, Apr. 2017, pp. 1-25.
Mustala et al., "Common Public Radio Interface", eCPRI Overview, Aug. 31, 2017, 42 pages.
"Common Public Radio Interface: eCPRI Interface Specification", eCPRI Specification V1.0, Aug. 22, 2017, pp. 1-62.
"Industry Leaders Launch ORAN Alliance", AT&T, Feb. 27, 2018, pp. 1-5.
"3rd Generation Partnership Project; Technical Specification Group Radio Access Network; NR; Radio Link Control (RLC) protocol specification (Release 15)", 3GPP TS 38.322, V15.1.0, Mar. 2018, pp. 1-33.
"3rd Generation Partnership Project; Technical Specification Group Radio Access Network; NR; Packet Data Convergence Protocol (PDCP) specification (Release 15)", 3GPP TS 38.323, V15.1.0, Mar. 2018, pp. 1-25.

\* cited by examiner

SIGNALING FOR CONTROLLING POWER USAGE IN RADIO ACCESS NETWORKS

CROSS-REFERENCE TO RELATED APPLICATION

This application claims priority from U.S. Provisional Patent Application No. 62/685,520 filed Jun. 15, 2018, which is hereby incorporated by reference in its entirety.

BACKGROUND

In radio access networks, radio access nodes may consume a substantial amount of power, and may contribute to causing overload of the electrical grid. To address such power consumption issues, and other issues related to radio access networks, methods and systems for controlling power usage of the radio access nodes may be developed.

BRIEF SUMMARY

This Brief Summary is provided to introduce a selection of concepts in a simplified form that are further described below in the Detailed Description. This Brief Summary is not intended to identify key features or essential features of the various embodiments, nor is it intended to be used to limit the scope of the claims.

Systems, apparatuses, and methods are described for controlling power usage in radio access networks. A central unit may be configured to receive, from an element management system, one or more first messages indicating power saving policies. The central unit may determine, based on the power saving policies, an idle period, and may send, to a distributed unit, a second message indicating the idle period. The distributed unit may activate, for the idle period, a power saving mode of the distributed unit. An apparatus may comprise one or more processors and memory storing instructions that, when executed by the one or more processors, cause the apparatus to perform any of the methods described herein. Additional examples are further discussed below.

BRIEF DESCRIPTION OF THE DRAWINGS

Some example embodiments are illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which are shown by way of illustration various embodiments in which the disclosure may be practiced. It is to be understood that other embodiments may be utilized and structural and functional modifications may be made without departing from the scope of the present disclosure.

Figure 1:
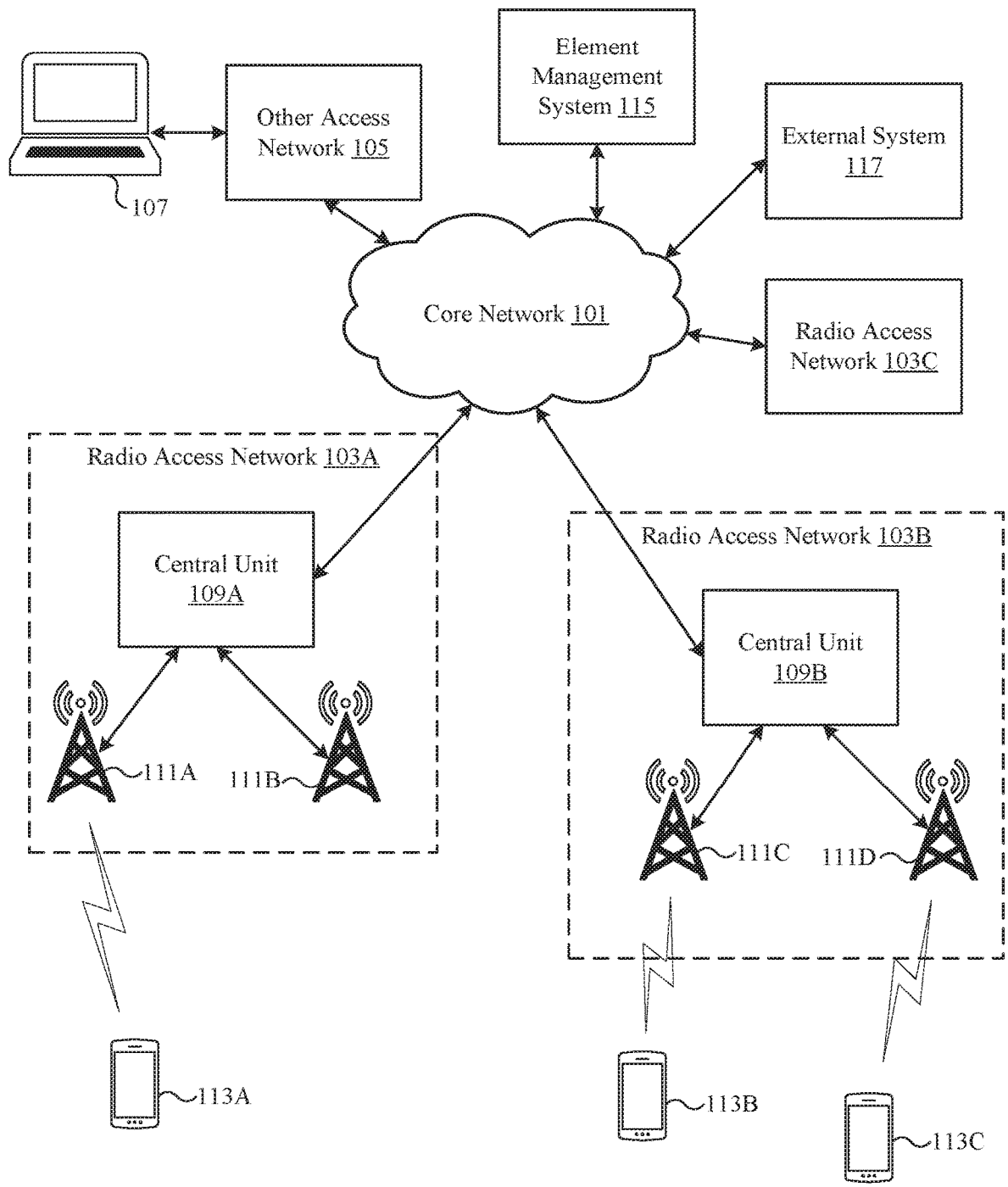
FIG. 1 is a schematic diagram showing an example communication network in which features described herein may be implemented.

FIG. 1 is a schematic diagram showing an example communication network in which features described herein may be implemented. The communication network may include one or more core networks (e.g., core network 101), one or more radio access networks (e.g., radio access networks 103A-103C), one or more other access networks (e.g., other access network 105), one or more user devices (e.g., user devices 107, 113A-113C), one or more element management systems (e.g., element management system 115), and one or more external systems (e.g., external system 117).

The core network 101 may be a single network or a collection of multiple connected networks. The core network 101 may include one or more of any of various types of information distribution networks, such as, without limitation, a satellite network, a telephone network, a cellular network, a Wi-Fi network, an Ethernet network, an optical fiber network, a coaxial cable network, a hybrid fiber coax network, etc. The core network 101 may include a local area network (LAN), a wide area network (WAN), a backbone network, etc. The core network 101 may include an Internet Protocol (IP) based network (e.g., the Internet). The core network 101 may use a plurality of interconnected communication links to connect the radio access networks 103A-103C, the other access network 105, the element management system 115, and the external system 117.

The radio access networks 103A-103C may implement radio access technologies (e.g., the third generation wireless systems (3G), the fourth generation wireless systems (4G), Long Term Evolution (LTE), the fifth generation wireless systems (5G), etc.). A radio access network of the radio access networks 103A-103C may include one or more central units (CU) and one or more distributed units (DU). For example, the radio access network 103A may include a central unit 109A and distributed units 111A-111B, and the radio access network 103B may include a central unit 109B and distributed units 111C-111D.

A central unit may also be referred to as a base band unit (BBU) or a radio equipment control (REC). A distributed unit may also be referred to as a radio unit (RU) or a radio equipment (RE). Such network architecture may be referred to as a cloud radio access network architecture. A central unit may be connected to one or more distributed units. Together a central unit and one or more distributed units may comprise a radio access node carrying out a radio protocol stack. In a 5G context, a combination of a central unit and one or more distributed units may comprise a gNB (or gNodeB). The gNB may be sometimes referred to as the 5G base station.

The central units 109A-109B may communicate with the core network 101 via any type of communication link, such as fiber, cable, Ethernet, etc. The central unit 109A may communicate with the distributed units 111A-111B, and the central unit 109B may communicate with the distributed units 111C-111D, via any types of communication links, such as fiber, cable, Ethernet, etc.

A central unit of the central units 109A-109B may be any type of computing device (e.g., device 812). From a physical standpoint, the central unit may be implemented as a single device (such as a single server) or as a plurality of devices (such as a plurality of servers). Additionally or alternatively, the central units 109A-109B may be implemented in a centralized server (e.g., in a cloud computing datacenter). For example, data center network technology and/or cloud computing technology (not illustrated) may be used to implement the central units 109A-109B in a centralized deployment, forming a pool of interconnected central units. The central units 109A-109B may be implemented as virtual nodes using virtualization technology. And real-time virtualization may allow computing resources to be dynamically allocated to the central units 109A-109B according to network load.

A distributed unit of the distributed units 111A-111D may be implemented as one or more computing devices (e.g., device 812, located at a cell tower or base station). The distributed units 111A-111D may communicate with the central units 109A-109B via any type of communication link (e.g., a wired or wireless IP-based communication link). A distributed unit of the distributed units 111A-111D may include a radio component for wireless communication (e.g., mounted at the top of a cell tower or base station). The distributed unit may establish wireless communication links with user devices (e.g., the user devices 113A-113C). The wireless communication links may be implemented according to various standards, such as 3G, 4G, LTE, 5G, etc.

The user devices 107, 113A-113C may be, for example, smartphones, personal computers, tablets, desktop computers, laptop computers, gaming devices, virtual reality headsets, or any other mobile device or other fixed device having a wireless interface configured to communicating with a distributed unit. Some user devices (e.g., user device 107) may connect via the other access network 105 that might not be a radio access network. Although the concepts described below are described with respect to radio access networks, the principles described herein may be used in other types of access networks.

The element management system 115 may comprise, for example, one or more computing devices implementing processes. The element management system 115 may comprise, for example, systems and/or applications for managing network elements via the network element management layer of the Telecommunications Management Network (TMN) model. The element management system 115 may be configured to perform functions in various areas, such as fault, configuration, accounting, performance, and security (FCAPS). The element management system 115 may be configured to manage one or more of a specific type of telecommunications network elements, such as the central units 109A-109B and the distributed units 111A-111D.

The external system 117 may comprise, for example, any type of system for providing a service or resource. For example, the external system 117 may be an electric power company. The external system 117 may provide electricity to the central units 109A-109B, the distributed units 111A-111D, the user device 107, or other devices or equipment (e.g., via power lines).

If the electrical grid is overloaded, or if the external system 117 predicts that the electrical grid may be overloaded, the external system 117 may disconnect devices (e.g., the central units 109A-109B or the distributed units 111A-111D) from the power grid, in order to restore normal function of the electrical grid or to prevent overload of the electrical grid. The external system 117 may disconnect a device (e.g., the central units 109A-109B or the distributed units 111A-111D) from the power grid in various manners. For example, a control unit may be installed in the device, and may be configured to disconnect the device from the power line if the control unit receives a message to disconnect the device. And the external system 117 may send to the control unit (e.g., via a wireless link) a message to disconnect the device.

Figure 2:
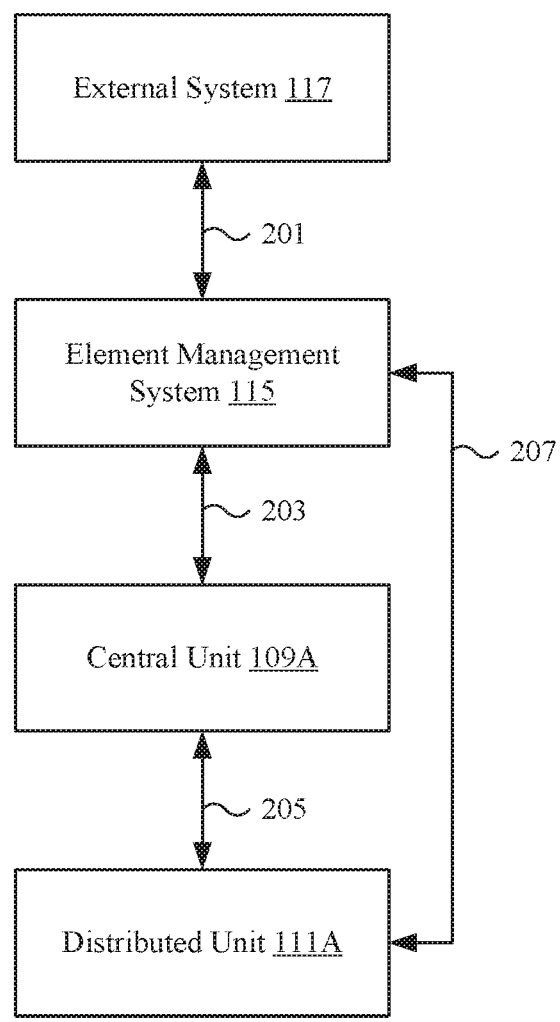
FIG. 2 is a schematic diagram showing an example system that controls power usage in a radio access network.

FIG. 2 is a schematic diagram showing an example system that controls power usage in a radio access network. The system may include the external system 117, the element management system 115, the central unit 109A, and the distributed unit 111A. The features and operations described below in connection with the central unit 109A and the distributed unit 111A may also be found in, and performed by, the central unit 109B and the distributed units 111B-111D.

The system may comprise one or more communication links (e.g., communication link 201, 203, 205, 207). The communication links 201, 203, 205, 207 may be any type of communication links, such as fiber, cable, Ethernet, etc. Additionally or alternatively, the communication links 201, 203, 205, 207 may be IP-based communication links or logical connections over an IP-based network (e.g., the core network 101). The central unit 109A, the distributed unit 111A, the element management system 115, and the external system 117 may each have an IP address, and may communicate with each other using their IP addresses.

The element management system 115 may manage the network elements, such as the central unit 109A and the distributed unit 111A. The element management system 115 may manage the central unit 109A via the communication link 203, and may manage the distributed unit 111A via the communication link 207. Additionally or alternatively, the element management system 115 may manage the distributed unit 111A through the central unit 109A. For example, the element management system 115 may send management messages to the central unit 109A via the communication link 203, and the central unit 109A may relay (as received or reformatted/re-encoded) the management messages to the distributed unit 111A via the communication link 205.

Using the management messages, the element management system 115 may, for example, configure parameters of the network elements, trigger a restart of the network elements, name the network elements, set the bandwidth or power consumption for the network elements, etc. Functionally, the element management system 115 may manage the network elements via a control and management plane or a network element management layer, such as the network element management layer of the Telecommunications Management Network (TMN) model.

The element management system 115 may send messages to power off the central unit 109A or distributed unit 111A via the control and management plane. The sending of the power-off messages may be based on power conditions, such as a power overload condition or a determination to reduce power consumption. But data sent via the control and management plane might not be time sensitive, and may be set to a low priority as treated by the network. Delivery of packets via the control and management plane may be in the order of seconds (e.g., 4 seconds). To reduce the latency in sending the power control messages, real time messages may be used, so that the power usage of the radio access nodes may be controlled with higher efficiency and granularity. More details regarding the real time messages are discussed in connection with FIG. 4.

Figure 3:
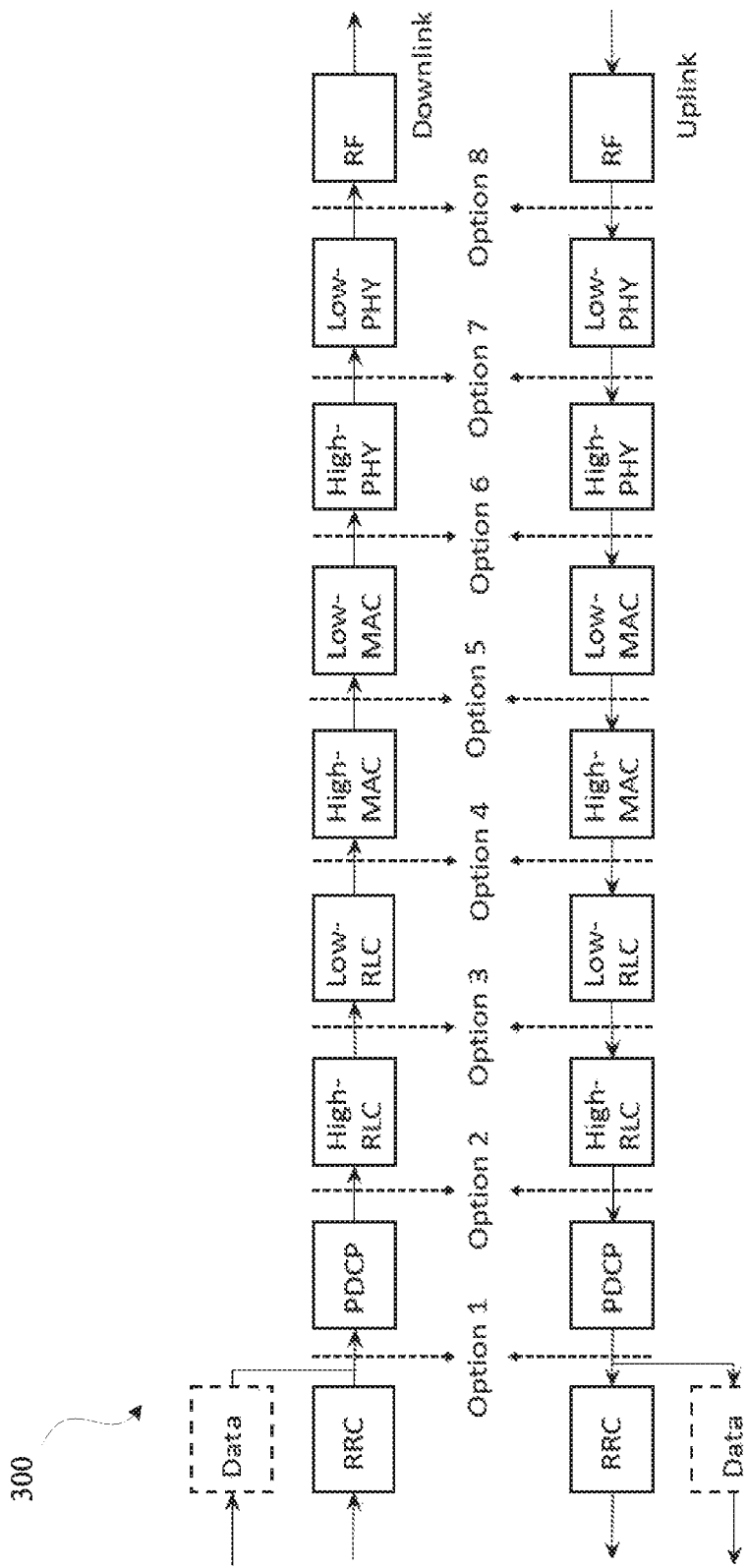
FIG. 3 is a schematic diagram showing an example of a radio protocol stack.

The central unit 109A and the distributed unit 111A may communicate with each other via the communication link 205, and may together carry out the radio protocol stack. FIG. 3 is a schematic diagram showing an example of a radio protocol stack 300. The radio protocol stack 300 may include a downlink path and an uplink path. In each path, the radio protocol stack 300 may include one or more functional layers, such as the radio resource control (RRC), the packet data convergence protocol (PDCP), the higher layer of radio link control (high-RLC), the lower layer of radio link control (low-RLC), the higher layer of media access control (high-MAC), the lower layer of media access control (low-MAC), the higher physical layer (high-PHY), the lower physical layer (low-PHY), and the radio frequency (RF). The radio protocol stack 300 and/or the functional layers in the radio protocol stack 300 discussed herein may have similar meanings as those specified by 3GPP (e.g., in 3GPP Technical Specification 38.322, 3GPP Technical Specification 38.323, etc.).

The different layers of the radio protocol stack 300 may be implemented by different entities (e.g., the central unit 109A or the distributed unit 111A). For example, the central unit 109A may be configured to perform some layers of the radio protocol stack 300 (e.g., some higher layers of the radio protocol stack), and the distributed unit 111A may be configured to perform some other layers of the radio protocol stack 300 (e.g., some lower layers of the radio protocol stack).

FIG. 3 shows various options for splitting the radio protocol stack 300 between a central unit and a distributed unit (e.g., options 1-8). In one example, the radio protocol stack 300 may be split at option 2. In this case, the RRC and the PDCP may be performed by the central unit 109A, and the lower layers (such as the high-RLC, low-RLC, high-MAC, low-MAC, high-PHY, low-PHY, and RF) may be performed by the distributed unit 111A. If the radio protocol stack 300 is split in this manner, the communication link 205 between the central unit 109A and the distributed unit 111A may be referred to as the F1 interface (e.g., as defined by 3GPP).

Alternatively, the radio protocol stack 300 may be split at option 7. In this case, the higher layers (such as the RRC, PDCP, high-RLC, low-RLC, high-MAC, low-MAC, and high-PHY) may be performed by the central unit 109A, and the lower layers (such as the low-PHY and RF) may be performed by the distributed unit 111A. In this case, the communication link 205 between the central unit 109A and the distributed unit 111A may be referred to as the common public radio interface (CPRI). In the context of 5G, the CPRI interface may also be referred to as the e-common public radio interface (eCPRI), the central unit 109A may be referred to as the eCPRI radio equipment control (eREC), and the distributed unit 111A may be referred to as the eCPRI radio equipment (eRE). More details regarding the eCPRI interface are discussed in connection with FIG. 5.

Additionally or alternatively, the radio protocol stack 300 may be split in various other manners. The split may be symmetrical or asymmetrical such that it is between the same or different layers for the downlink path and the uplink path. For example, the split may be at option 2 for both the downlink path and the uplink path. Alternatively, the split may be at option 2 for the downlink path, and at option 7 for the uplink path.

Figure 4:
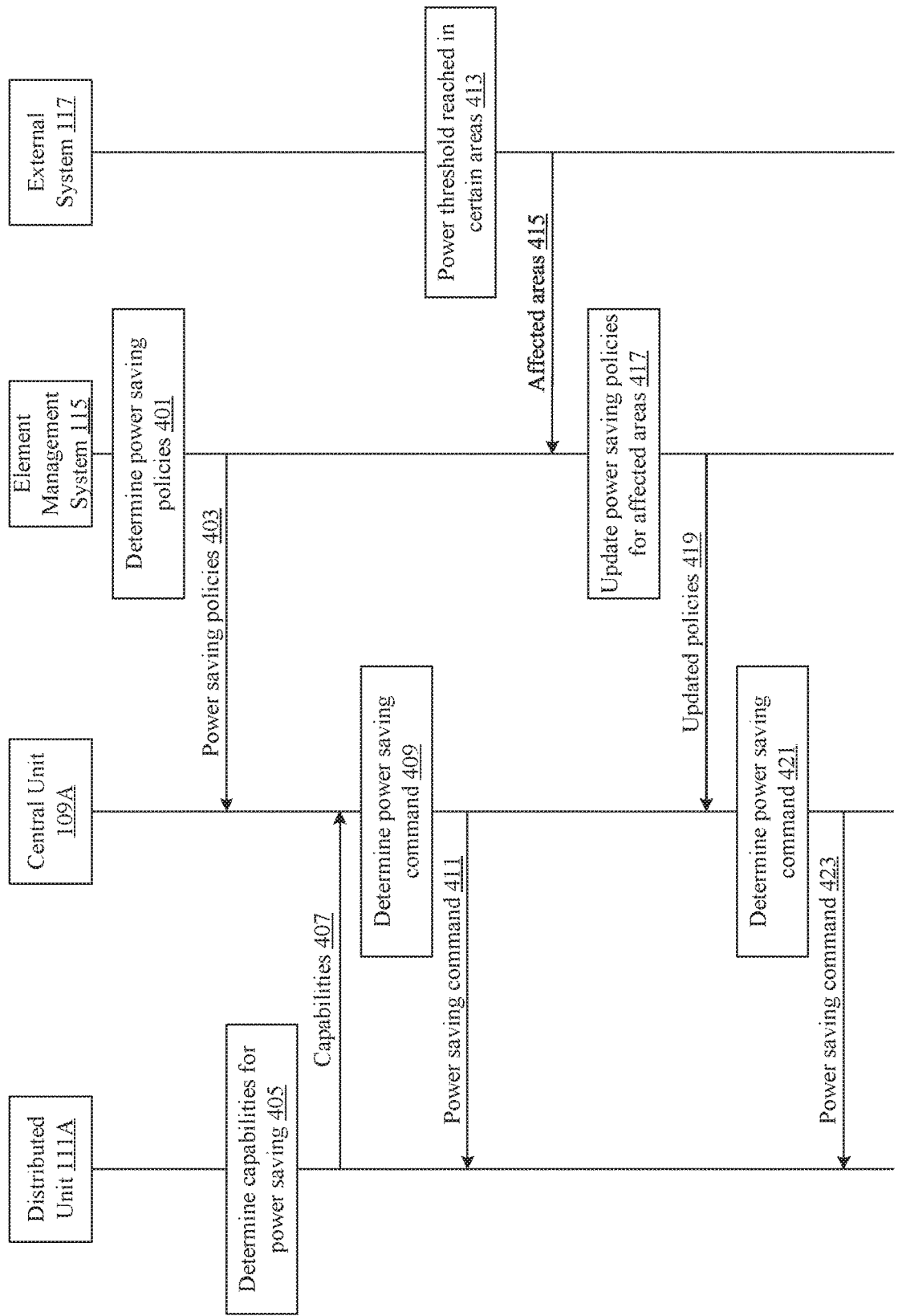
FIG. 4 is an event sequence showing example methods and devices for controlling power usage in a radio access network.

FIG. 4 is an event sequence showing example methods and devices for controlling power usage in a radio access network. While the steps of the event sequence are described in a particular order, the order of the steps may be altered without departing from the scope of the disclosure provided herein. Although the event sequence is described as being performed by a particular arrangement of computing systems, devices, and/or networks (e.g., the central unit 109A, the distributed unit 111A, the element management system 115, and/or the external system 117), the processes may be performed by a greater or smaller number of computing systems, devices, and/or networks, and/or by any type of computing system, device, and/or network.

In step 401, the element management system 115 may determine power saving policies. The power saving policies may include, for example, power saving functions (e.g., powering off or reducing power of transmitters or receivers at the distributed units, changing beamforming methods, etc.) and/or conditions triggering the power saving functions.

The element management system 115 may determine, for example, the geographical areas in which the power saving functions may be applied. One or more distributed units may be located in a geographical area. By specifying the geographical areas in which the power saving functions may be applied, the element management system 115 may configure the central unit 109A to apply the power saving functions to a subset of the distributed units connected to the central unit 109A (e.g., the distributed units located in, or serving, the specified geographical areas). Additionally or alternatively, the element management system 115 may determine the identities of the distributed units that may be subject to the power saving functions. Additionally or alternatively, the element management system 115 may determine the frequency bands that may be subject to the power saving functions independent of other frequency bands not subject to power saving functions. A frequency band may be managed or utilized by one or more distributed units, and the central unit 109A may determine, based on the frequency bands subject to power saving functions, the identities of the distributed units that may be subject to the power saving functions.

The element management system 115 may determine, for example, the type of user, the type of user traffic, or the IP address of a user to which the power saving functions may be applied or might not be applied. The element management system 115 may determine that the power saving functions might not be applied to a central unit or distributed unit, if a privileged user (e.g., a user requiring low latency data transmission) is connected to the central unit or distributed unit. The element management system 115 may determine that the power saving functions may be applied to a central unit or distributed unit, if no privileged users are connected to the central unit or distributed unit, or if the number of privileged users connected to the central unit or distributed unit is below a threshold number. Additionally or alternatively, the element management system 115 may determine not to apply the power saving functions, if the priority of the traffic processed by a central unit or distributed unit is higher than a priority threshold. The priority of the traffic may be determined based on the QoS class identifier (QCI) associated with the traffic. If the priority of the traffic is above a threshold, the power saving functions might not be applied so that the power saving functions might not interfere with prompt transmission of the traffic. Similarly, the element management system 115 may determine to apply the power saving functions, if the priority of the traffic processed by a central unit or distributed unit is lower than a priority threshold.

The element management system 115 may determine, for example, a time period in which the power saving functions may be applied. The time period may include a first time of day as the start point where the power saving functions may be applied, and may include a second time of day (or a duration) as the end point where the power saving functions may be applied. For example, the element management system 115 may determine to configure the central unit 109A to apply the power saving functions to the distributed units connected to the central unit 109A during a night period (e.g., 1 AM to 5 AM), when there may be less user data to be processed by the distributed units. Based on the power saving policies, at least some of the processing resources of the central unit 109A may be powered off during night time, and the load of the powered off processing resources may be moved to some other processing resources. Similarly, based on the power saving policies, at least some of the processing resources of the distributed unit 111A may be powered off. For example, some baseband processing components such as processors or hardware accelerator blocks, RF components, or antenna components of the distributed unit 111A may be powered off based on the power saving policies. And the load of powered off components of the distributed unit 111A may be moved to some other components of the distributed unit 111A. Alternatively, the distributed unit 111A may be completely powered off or entered into a power saving mode, and all of the load of the distributed unit 111A may be moved to another distributed unit.

The element management system 115 may determine, for example, one or more thresholds, related to key performance indicators (KPI) of the distributed units, that may trigger the application of the power saving functions. The central unit 109A may be configured to apply the power saving functions based on the load of the central unit 109A. For example, if the load of the central unit 109A does not satisfy (e.g., exceed or meet) a load threshold, the central unit 109A may determine to apply the power saving functions to the distributed units connected to the central unit 109A. The load may be indicated by an amount of traffic, the physical resource block (PRB) utilization rate, the number of active users connected, or other indicators. Additionally or alternatively, the central unit 109A may be configured to apply the power saving functions to a distributed unit connected to the central unit 109A based on the load of the distributed unit. For example, if the load of the distributed unit does not satisfy a load threshold, the central unit 109A may determine to apply the power saving functions to the distributed unit.

The power saving functions may include, for example, reducing transmission power of the distributed units, powering off or configuring into low power state (e.g., dormant mode) the transmitters or receivers of the distributed units, powering off or configuring into low power state individual processing components of the distributed units, changing beamforming mechanisms, changing compression schemes. The power saving functions may additionally or alternatively be applied to the central units, such as powering off or configuring into low power state processing resources of the central units (e.g., baseband cards in the central units). More details regarding the power saving functions will be discussed below.

After step 401, the method may proceed to step 403. In step 403, the element management system 115 may send, to the central unit 109A, a message indicating the power saving policies as determined in step 401. For example, the message may indicate the power saving functions and/or the conditions triggering the power saving functions. Using the message, the element management system 115 may configure the central unit 109A to behave according to the determined power saving policies. The central unit 109A may receive the message indicating the power saving policies, and may configure itself according to the power saving policies (e.g., implement the power saving policies). For example, based on the message, the central unit 109A may be configured to execute the power saving functions if the central unit 109A determines that one or more conditions indicated in the message are satisfied.

The message indicating the power saving policies may be sent from the element management system 115 to the central unit 109A via the control and management plane of the communication link 203. The message may be a non-real time message, and the latency for delivering the message may be in order of seconds (e.g., 4 seconds).

After step 403, the method may proceed to step 405. In step 405, the distributed unit 111A may determine its capabilities for accepting (e.g., executing) power saving commands. The distributed unit 111A may make this determination after the distributed unit 111A comes online (e.g., initially connected the central unit 109A, initially powered on, reset, etc.). For example, the distributed unit 111A may determine whether it is configured to power off the transmitters and/or receivers for a short time period (e.g., 10 milliseconds) if it receives a command to do so. The capabilities of the distributed unit 111A for accepting power saving commands may depend on the hardware and/or software capabilities of the distributed unit 111A.

After step 405, the method may proceed to step 407. In step 407, the distributed unit 111A may send, to the central unit 109A, a message indicating the capabilities of the distributed unit 111A for accepting power saving commands. The central unit 109A may receive the message. Based on the message, the central unit 109A may determine whether to apply certain power saving functions to the distributed unit 111A. For example, if the message indicates that the distributed unit 111A is not configured to execute commands to power off its transmitter, the central unit 109A may determine not to apply the power saving functions that may involve sending a command to power off a transmitter of a distributed unit. Additionally or alternatively, the message indicting the capabilities of the distributed unit 111A for accepting power saving commands may be sent to the element management system 115 (e.g., directly or indirectly). And the element management system 115 may determine, based on the message, the power saving policies. For example, if the element management system 115 determines, based on the message, that the distributed unit 111A does not have the capabilities to accept power saving commands, the element management system 115 may indicate, in the power saving policies, not to apply the power saving functions to the distributed unit 111A.

After step 407, the method may proceed to step 409. If the central unit 109A determines that the distributed unit 111A has the capabilities to execute power saving commands, the central unit 109A may determine to apply the power saving functions to the distributed unit 111A if one or more conditions triggering the power saving functions are satisfied. For example, the central unit 109A may determine whether the distributed unit 111A is within the geographical area in which the power saving functions may be applied. The central unit 109A may determine whether the load of the distributed unit 111A is below a load threshold. The central unit 109A may otherwise determine whether the distributed unit 111A is subject to the power saving functions. The conditions triggering the power saving functions may be indicated in the message sent from the element management system 115 in step 403.

If the central unit 109A determines that one or more conditions triggering the power saving functions are satisfied, the central unit 109A may determine power saving commands in step 409. For example, the power saving command may indicate an idle period in which no data might be send or received by the distributed unit 111A, and hence the distributed unit 111A may power off all or a portion of its the transmission components or reception components. Additionally or alternatively, the central unit 109A may determine the power saving command to instruct the distributed unit 111A to change its beamforming mechanisms. For example, the power saving command may instruct the distributed unit 111A to change to applying coarser or wider beams, or to applying non-adaptive (static) beamforming. Additionally or alternatively, the power saving command may instruct the distributed unit 111A to change its compression schemes. Additionally or alternatively, the power saving command may instruct the distributed unit to reduce the transmission power of its output signals.

In step 411, the central unit 109A may send, to the distributed unit 111A, a message indicating the power saving command. The message indicating the power saving command may be sent via the communication link 205. The message may be a real time message (e.g., sent via the user plane of the eCPRI interface or sent via the real time control and/or user plane of the F1 interface), and the delivery of the message may take a few milliseconds (e.g., 4 milliseconds). More details regarding controlling power usage using the power saving command are discussed in connection with FIG. 5.

In step 413, the external system 117 (e.g., an electric power company) may determine whether a power consumption threshold has been reached in certain geographical areas. The external system 117 may set one or more power consumption thresholds corresponding to one or more geographical areas, for example, in order to prevent an overload of the power grid, substation, etc. A power consumption threshold may indicate a maximum amount of electrical power from the power grid that may be consumed by users in the corresponding geographical area. The external system 117 may monitor the power consumption in each geographical area, and may detect whether the power consumption threshold corresponding to the geographical area has been reached. If the power consumption threshold corresponding to a geographical area has been reached, the external system 117 may take steps to reduce power consumption in the geographical area. For example, the external system 117 may configure the central units or distributed units in the geographical area to save power (e.g., by powering off transmitters when no user data are expected to be sent).

After step 413, the method may proceed to step 415. In step 415, the external system 117 may send, to the element management system 115, a message indicating the geographical areas in which the power consumption thresholds have been reached. The element management system 115 may receive the message.

In step 417, the element management system 115 may update the power saving policies based on the message indicating the affected geographical areas. For example, the element management system 115 may update the power saving policies so that the power saving functions may be applied in the affected geographical areas. In this manner, a central unit or a distributed unit, in an affected geographical area, that were not subject to the power saving functions, may now be set to be subject to the power saving functions.

After step 417, the method may proceed to step 419. In step 419, the element management system 115 may send, to the central unit 109A, a message indicating the updated power saving policies. For example, the message may indicate that the affected geographical areas may be subject to the power saving functions, so that power consumption of the central units or distributed units in the affected geographical areas may be reduced. The central unit 109A may receive the message, and may configure itself to perform according to the updated power saving policies (e.g., implement the power saving policies).

After step 419, the method may proceed to step 421. In step 421, the central unit 109A may determine power saving commands. After step 421, the method may proceed to step 423. In step 423, the central unit 109A may send the determined power saving commands to the distributed unit 111A. Steps 421, 423 may be performed in similar manners as steps 409, 411.

Figure 5:
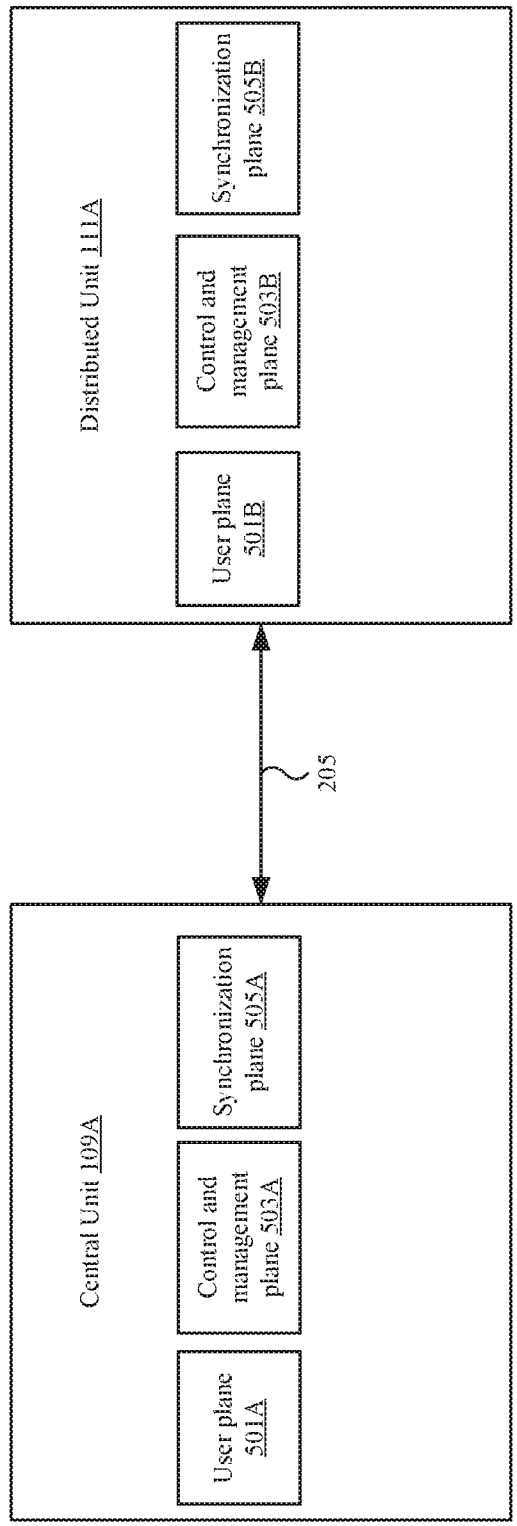
FIG. 5 is a schematic diagram showing an example system for signaling for controlling power usage.

FIG. 5 is a schematic diagram showing an example system for signaling for controlling power usage. The system may include the central unit 109A, the distributed unit 111A, and the communication link 205. The features and operations described below in connection with the central unit 109A and the distributed unit 111A may also be found in, and performed by, the central unit 109B and the distributed units 111B-111D.

The system may be configured to implement protocols for communication between central units and distributed units, for example, using the eCPRI protocol. The communication link 205 may be implemented as the eCPRI interface. The central unit 109A and the distributed unit 111A may comprise the functional entities (e.g., protocol layers) used to establish the connection between the central unit 109A and the distributed unit 111A. For example, the central unit may include a user plane 501A, a control and management plane 503A, and a synchronization plane 505A. The user plane 501A may be configured to communicate, for example, three types of data flows: (1) data flow to be transferred between the radio access node and user devices; (2) real time control data related to the first data flow; and (3) other eCPRI flows not covered by other protocol planes. The control and management plane 503A may be configured to communicate data flow for the operation, administration, and/or maintenance of the radio access node. For example, the control and management plane 503A may be used to forward a message from the element management system 115 to the distributed unit 111A. The synchronization plane 505A may be configured to communicate data flow for synchronization and timing information between the central unit 109A and the distributed unit 111A. The distributed unit 111A may include a corresponding user plane 501B, control and management plane 503B, and synchronization plane 505B, for communicating with the central unit 109A. The eCPRI interface 205 and the associated protocol layers and/or functional planes may have similar meanings as those specified in eCPRI Specification V1.0 (Aug. 22, 2017) Common Public Radio Interface: eCPRI Interface Specification.

Figure 6:
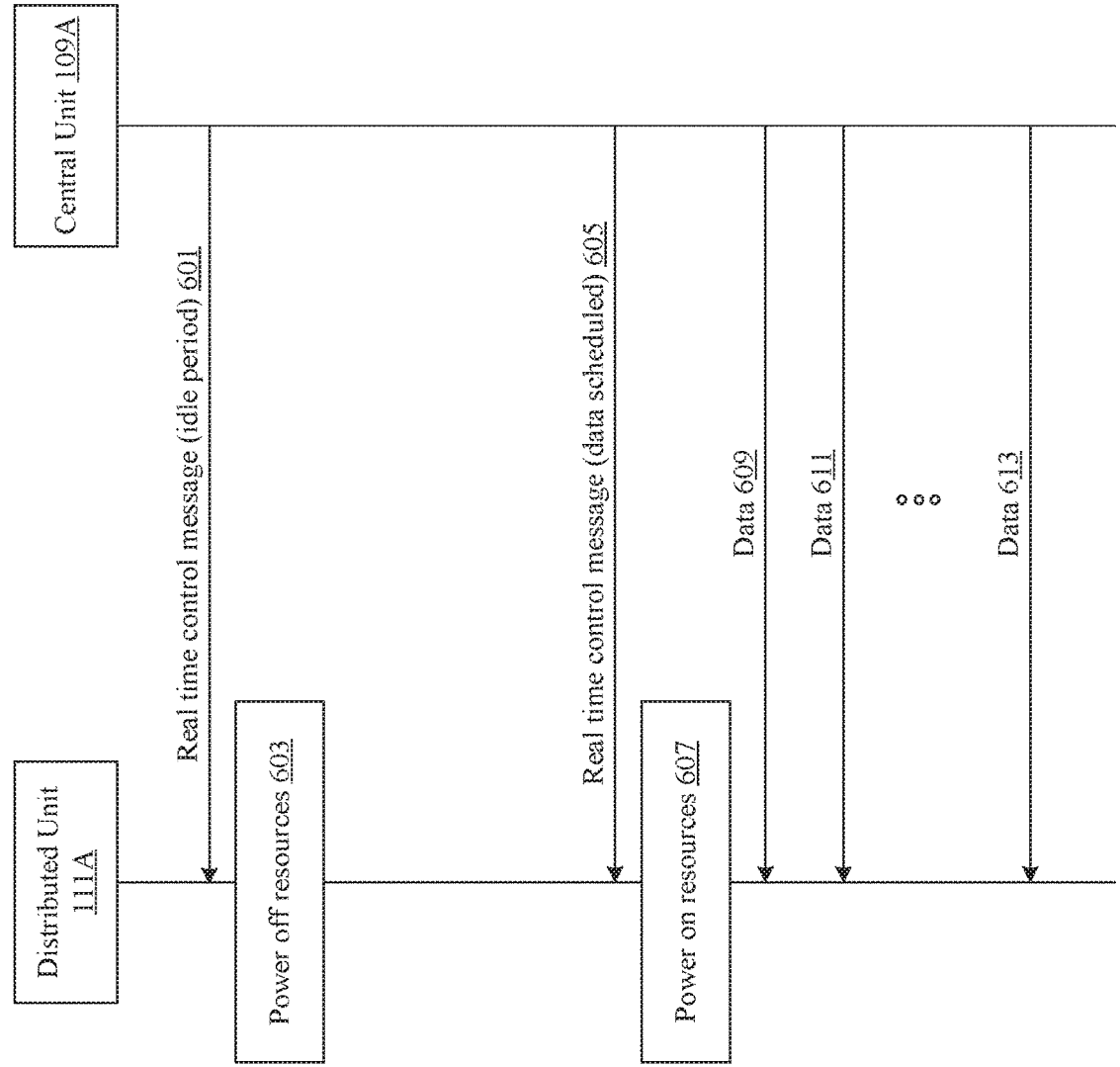
FIG. 6 is an event sequence showing example methods and devices for signaling for controlling power usage.

FIG. 6 is an event sequence showing example methods and devices for signaling for controlling power usage. Step 411 of FIG. 4 may, for example, be implemented with steps 601, 605 of FIG. 6. Step 423 of FIG. 4 may, for example, be implemented with steps 601, 605 of FIG. 6. While the steps of the event sequence are described in a particular order, the order of the steps may be altered without departing from the scope of the disclosure provided herein. Although the event sequence is described as being performed by a particular arrangement of computing systems, devices, and/or networks (e.g., the central unit 109A and/or the distributed unit 111A), the processes may be performed by a greater or smaller number of computing systems, devices, and/or networks, and/or by any type of computing system, device, and/or network.

The power saving commands sent by the central unit 109A in steps 411, 423 may be implemented as real time messages, where the communication link 205 between the central unit 109A and the distributed unit 111A may use a standardized interface, for example, the eCPRI interface. For example, the power saving command may be sent by the central unit 109A and to the distributed unit 111A via the user plane 501A (and/or 501B). In particular, the power saving command may be implemented as, or indicated in, a real time control message (e.g., a message type 2 eCPRI message sent over the user plane of the eCPRI interface). The power saving command may indicate a power saving action to be performed by the distributed unit 111A. Additionally or alternatively, the power saving command may comprise information about upcoming idle periods in the data (e.g., in the uplink and/or downlink data flows).

In step 601, the central unit 109A may send, to the distributed unit, a real time control message. The real time control message may indicate an idle period in which no downlink data (e.g., in-phase and quadrature (IQ) data or bit sequence data) might be sent in an eCPRI message (e.g., a message type 0 eCPRI message or a message type 1 eCPRI message) via the user plane of the eCPRI interface. The idle period may be represented by, for example, a number of symbols, a number of slots, a number of sub-frames, a number of frames, etc.

The distributed unit 111A may receive the real time control message, and may power off the resources of the distributed unit 111A for the idle period indicated in the real time control message in step 603. The resources powered off may include, for example, the hardware and/or software for performing the radio protocol stack portion that resides in the distributed unit 111A (e.g., the PHY layer, the RF, or components associated with antennas).

Additionally or alternatively, the real time control message may indicate one or more idle periods respectively corresponding to one or more frequency bands of the frequency spectrum used by the distributed unit 111A. The distributed unit 111A may power off one or more components, of the distributed unit 111A, that are responsible for transmitting data using the one or more frequency bands. The distributed unit 111A may power off the one or more components for their respective idle periods indicated in the real time control message. For example, the real time control message may indicate which physical resource block (PRB) might not be used. The distributed unit 111A may power off the component responsible for the PRB (for the time duration of the PRB).

Additionally or alternatively, the real time control message may indicate an idle period in which no uplink data might be received by the distributed unit 111A. The central unit 109A may include a scheduler configured to schedule uplink transmissions from the user devices. The scheduler may determine during which period and via which frequency band there might be no uplink transmission scheduled. The distributed unit 111A may power off one or more resources in the uplink transmission path of the distributed unit 111A. The distributed unit 111A may power off the uplink resources in a similar manner as with the downlink resources.

In step 605, the central unit 109A may send, to the distributed unit 111A, a second real time control message. The second real time control message may indicate that downlink or uplink data are scheduled following the idle period. In step 607, the distributed unit 111A may power on the downlink or uplink resources based on the second real time control message. After step 607, the central unit 109A may send, to the distributed unit 111A, one or more messages (e.g., the data messages in steps 609, 611, 613). The one or more messages may be message type 0 eCPRI messages.

Additionally or alternatively, the power saving commands sent by the central unit 109A in steps 411, 423 may be implemented as real time messages sent via the F1 interface or other types of interfaces between the central unit 109A and the distributed unit 111A.

Figure 7:
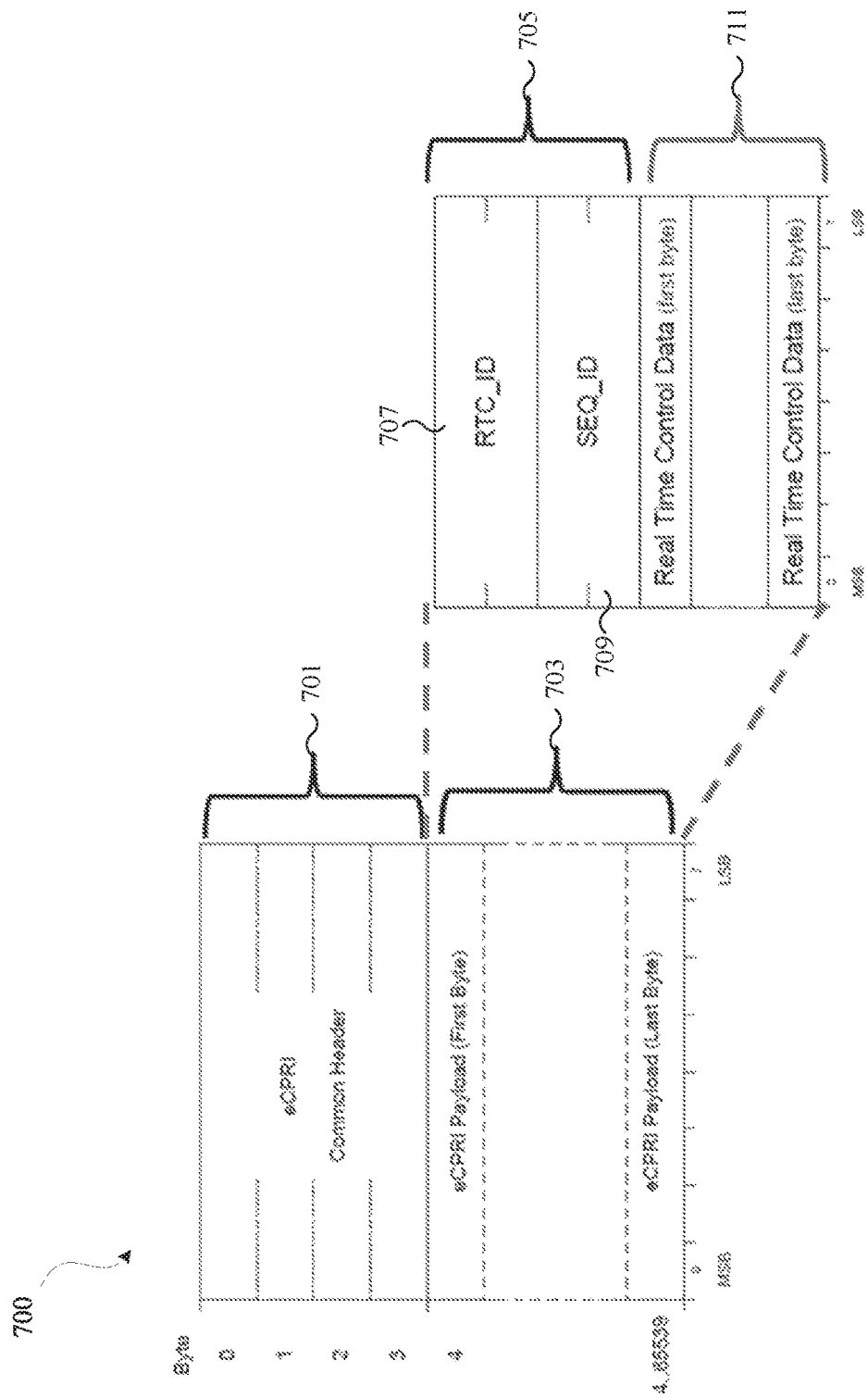
FIG. 7 shows an example message that may be used in accordance of various features described herein.

FIG. 7 shows an example message 700 (e.g., an eCPRI message) that may be used in accordance of various features described herein. The message 700 may include a common header 701 (e.g., an eCPRI common header) and a payload 703 (e.g., an eCPRI payload). The payload 703 may include an extended header 705 (e.g., an eCPRI extended header) and an extended payload 711 (e.g., an eCPRI extended payload). The extended header 705 may include, for example, an RTC_ID 707 and an SEQ_ID 709. These components may have similar meanings as those specified in eCPRI Specification V1.0 (Aug. 22, 2017) Common Public Radio Interface: eCPRI Interface Specification. The power saving commands sent by the central unit 109A in steps 411, 423 may be included in the extended payload 711, and the common header 701 may indicate, for example, that the message 700 is a message type 2 eCPRI message (a real time control message).

Figure 8:
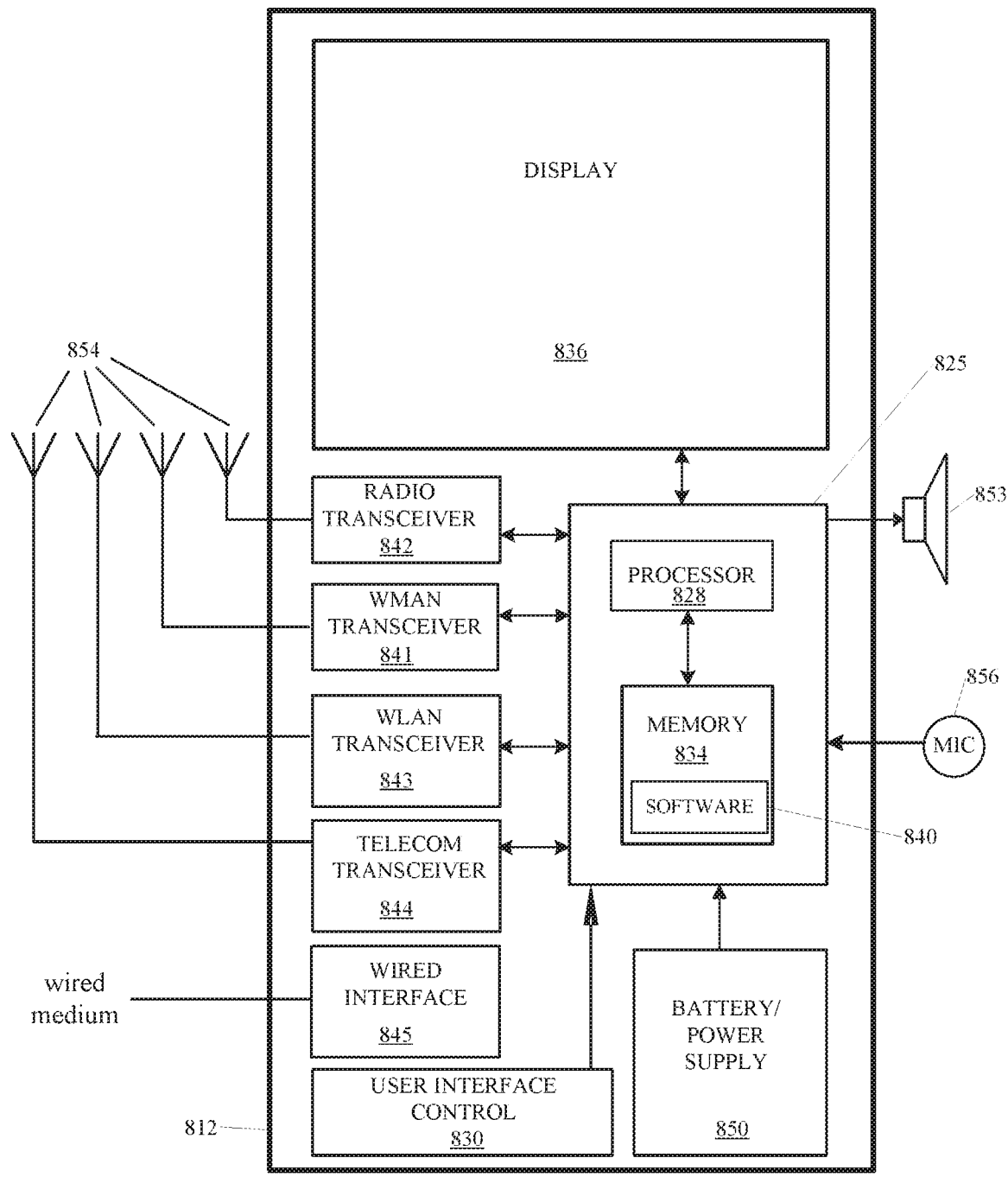
FIG. 8 shows an example apparatus that may be used in a network environment described herein or used to implement one or more aspects described herein.

FIG. 8 illustrates an example apparatus, in particular a computing device 812, that may be used in a communication network such as the one shown in FIG. 1, to implement any or all of the user devices 107, 113A-113C, the distributed units 111A-111D, the central units 109A-109B, and/or other computing devices to perform the steps described above and in FIGS. 2-7. Computing device 812 may include a controller 825. The controller 825 may be connected to a user interface control 830, display 836 and/or other elements as shown. Controller 825 may include circuitry, such as for example one or more processors 828 and one or more memory 834 storing software 840 (e.g., computer executable instructions). The software 840 may comprise, for example, one or more of the following software options: user interface software, server software, etc., including the radio protocol stack, the user planes 501A-501B, the control and management planes 503A-503B, and the synchronization planes 505A-505B.

Device 812 may also include a battery 850 or other power supply device, speaker 853, and one or more antennae 854. Device 812 may include user interface circuitry, such as user interface control 830. User interface control 830 may include controllers or adapters, and other circuitry, configured to receive input from or provide output to a keypad, touch screen, voice interface—for example via microphone 856, function keys, joystick, data glove, mouse and the like. The user interface circuitry and user interface software may be configured to facilitate user control of at least some functions of device 812 though use of a display 836. Display 836 may be configured to display at least a portion of a user interface of device 812. Additionally, the display may be configured to facilitate user control of at least some functions of the device (for example, display 836 could be a touch screen).

Software 840 may be stored within memory 834 to provide instructions to processor 828 such that when the instructions are executed, processor 828, device 812 and/or other components of device 812 are caused to perform various functions or methods such as those described herein (for example, as depicted in FIGS. 2-7). The software may comprise machine executable instructions and data used by processor 828 and other components of computing device 812 and may be stored in a storage facility such as memory 834 and/or in hardware logic in an integrated circuit, ASIC, etc. Software may include both applications and operating system software, and may include code segments, instructions, applets, pre-compiled code, compiled code, computer programs, program modules, engines, program logic, and combinations thereof.

Memory 834 may include any of various types of tangible machine-readable storage medium, including one or more of the following types of storage devices: read only memory (ROM) modules, random access memory (RAM) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 828 (and any other processor or computer described herein) may include any of various types of processors whether used alone or in combination with executable instructions stored in a memory or other computer-readable storage medium. Processors should be understood to encompass any of various types of computing structures including, but not limited to, one or more microprocessors, special-purpose computer chips, field-programmable gate arrays (FPGAs), controllers, application-specific integrated circuits (ASICs), hardware accelerators, digital signal processors, software defined radio components, combinations of hardware/firmware/software, or other special or general-purpose processing circuitry.

As used in this application, the term "circuitry" may refer to any of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone, server, or other computing device, to perform various functions) and (c) circuits, such as a microprocessor(s) or a portion of a microprocessor(s), that require software or firmware for operation, even if the software or firmware is not physically present.

These examples of "circuitry" apply to all uses of this term in this application, including in any claims. As an example, as used in this application, the term "circuitry" would also cover an implementation of merely a processor (or multiple processors) or portion of a processor and its (or their) accompanying software and/or firmware. The term "circuitry" would also cover, for example, a baseband integrated circuit or applications processor integrated circuit for a mobile phone or a similar integrated circuit in a server, a cellular network device, or other network device.

Device 812 or its various components may be mobile and be configured to receive, decode and process various types of transmissions including transmissions in Wi-Fi networks according to a wireless local area network (e.g., the IEEE 802.11 WLAN standards 802.11n, 802.11ac, etc.) and/or wireless metro area network (WMAN) standards (e.g., 802.16), through a specific one or more WLAN transceivers 843, one or more WMAN transceivers 841. Additionally or alternatively, device 812 may be configured to receive, decode and process transmissions through various other transceivers, such as FM/AM Radio transceiver 842, and telecommunications transceiver 844 (e.g., cellular network receiver such as CDMA, GSM, 4G LTE, 5G, etc.). A wired interface 845 (e.g., an Ethernet interface) may be configured to provide communication via a wired communication medium (e.g., fiber, cable, Ethernet, etc.).

Although the above description of FIG. 8 generally relates to a mobile device, other devices or systems may include the same or similar components and perform the same or similar functions and methods. For example, a computer communicating over a wired network connection (for example, the distributed units 111A-111D, the central units 109A-109B, the user device 107, the element management system 115, and the external system 117) may include the components or a subset of the components described above, and may be configured to perform the same or similar functions as device 812 and its components. Further access points as described herein may include the components, a subset of the components, or a multiple of the components (e.g., integrated in one or more servers) configured to perform the steps, described herein.

Figure 9:
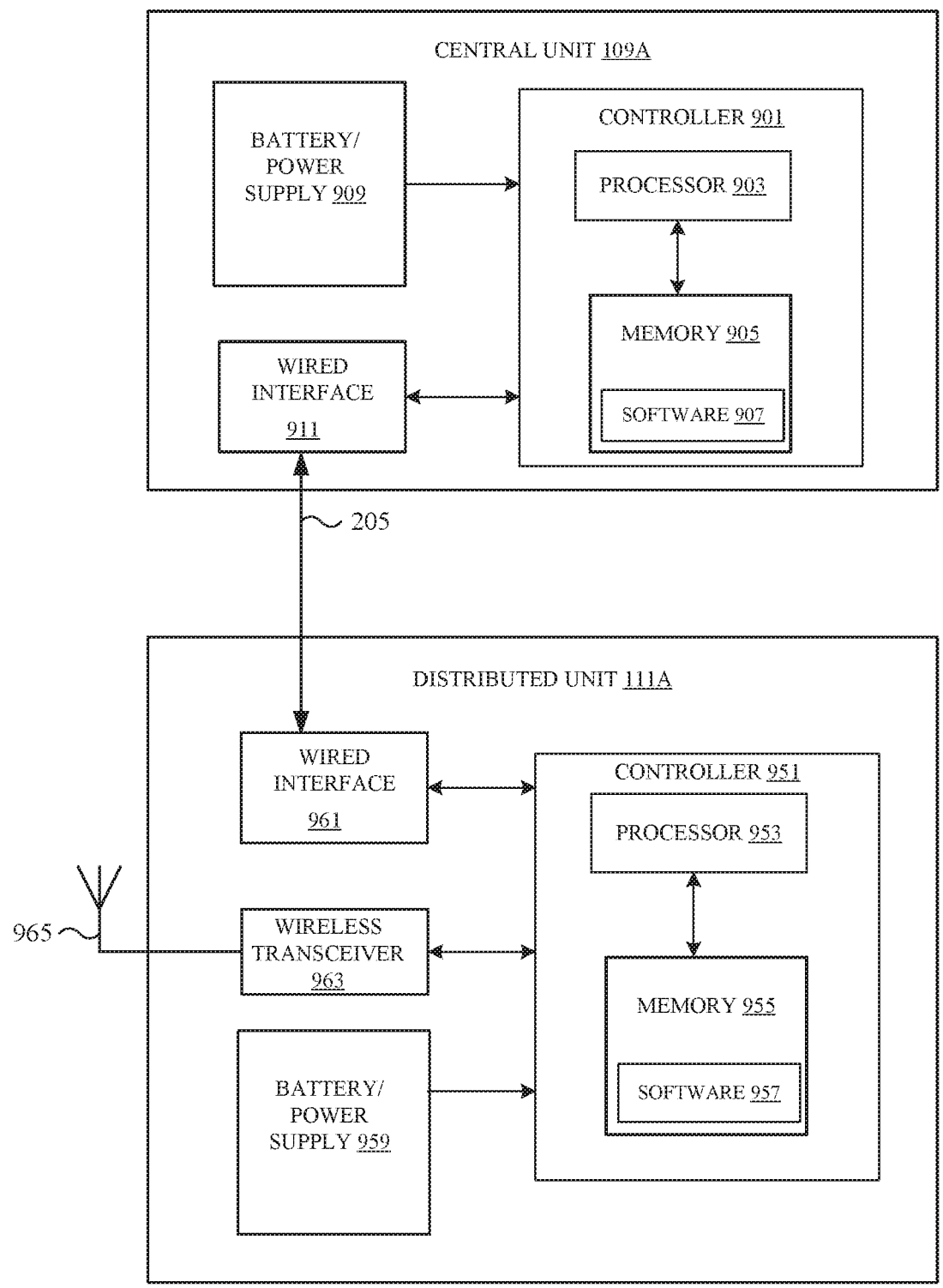
FIG. 9 shows an example system that may be used in a network environment described herein or used to implement one or more aspects described herein.

FIG. 9 illustrates an example system that may be used in a communication network such as the one shown in FIG. 1, to implement various devices described herein, such as central units (e.g., the central unit 109A), distributed units (e.g., the distributed unit 111A), and/or other computing devices to perform the steps described above and in FIGS. 2-7. The system may comprise one or more central units (e.g., the central unit 109A), one or more distributed units (e.g., the distributed unit 111A), and one or more communication links (e.g., the communication link 205).

The central unit 109A may include a controller 901, which may include circuitry, such as one or more processors 903 and one or more memory 905 storing software 907 (e.g., computer executable instructions). The software 907 may comprise, for example, a radio protocol stack portion that is implemented by the central unit 109A, the user plane 501A, the control and management plane 503A, and/or the synchronization plane 505A. Software 907 may be stored within memory 905 to provide instructions to processor 903 such that when the instructions are executed, processor 903, central unit 109A and/or other components of central unit 109A are caused to perform various functions or methods such as those described herein (for example, as depicted in FIGS. 2-7). The central unit 109A may include general-purpose processors, digital signal processors, hardware accelerators, or software defined radio components.

The central unit 109A may include a battery 909 or other power supply device, and one or more wired interface 911. The wired interface 911 (e.g., an Ethernet interface) may be configured to provide communication via a wired communication medium (e.g., fiber, cable, Ethernet, etc.). The wired interface 911 may communicate with a wired interface 961 in the distributed unit 111A via the communication link 205. The wired interface 911 may also communicate with a network (e.g., the core network 101).

The distributed unit 111A may include a controller 951, which may include circuitry, such as one or more processors 953 and one or more memory 955 storing software 957 (e.g., computer executable instructions). The software 957 may comprise, for example, a radio protocol stack portion that is implemented by the distributed unit 111A, the user plane 501B, the control and management plane 503B, and the synchronization plane 505B. Software 957 may be stored within memory 955 to provide instructions to processor 953 such that when the instructions are executed, processor 953, distributed unit 111A and/or other components of distributed unit 111A are caused to perform various functions or methods such as those described herein (for example, as depicted in FIGS. 2-7).

The distributed unit 111A may include a battery 959 or other power supply device, one or more wired interface 961, one or more wireless transceiver 963, and one or more antennae 965. The distributed unit 111A or its various components may be configured to receive, decode and process transmissions through various transceivers, such as wireless transceiver 963 (e.g., cellular network receiver such as CDMA, GSM, 4G LTE, 5G, etc.). The wireless transceiver 963 may include downlink processing components and/or uplink processing components. The downlink processing components and/or uplink processing components may include radio frequency transmission components, radio frequency reception components, or baseband processing components. Processing components may include general-purpose processors, digital signal processors, software defined radio components, hardware accelerators, or software components. With the wireless transceiver 963 and the antenna 965, the distributed unit 111A may be configured to communicate with a user device (e.g., the user devices 113A-113C) according to various aspects described herein. The wired interface 961 (e.g., an Ethernet interface) may be configured to provide communication via a wired communication medium (e.g., fiber, cable, Ethernet, etc.). The wired interface 961 may communicate with the wired interface 911 in the distributed unit 109A via the communication link 205.

The software may comprise machine executable instructions and data used by processor and other components of central unit 109A and/or distributed unit 111A and may be stored in a storage facility such as memory 905, 955 and/or in hardware logic in an integrated circuit, ASIC, etc. Software may include both applications and operating system software, and may include code segments, instructions, applets, pre-compiled code, compiled code, computer programs, program modules, engines, program logic, and combinations thereof.

Memory 905, 955 may include any of various types of tangible machine-readable storage medium, including one or more of the following types of storage devices: read only memory (ROM) modules, random access memory (RAM) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 903, 953 (and any other processor or computer described herein) may include any of various types of processors whether used alone or in combination with executable instructions stored in a memory or other computer-readable storage medium. Processors should be understood to encompass any of various types of computing structures including, but not limited to, one or more microprocessors, special-purpose computer chips, field-programmable gate arrays (FPGAs), controllers, application-specific integrated circuits (ASICs), combinations of hardware/firmware/software, or other special or general-purpose processing circuitry.

As used in this application, the term "circuitry" may refer to any of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone, server, or other computing device, to perform various functions) and (c) circuits, such as a microprocessor(s) or a portion of a microprocessor(s), that require software or firmware for operation, even if the software or firmware is not physically present.

These examples of "circuitry" apply to all uses of this term in this application, including in any claims. As an example, as used in this application, the term "circuitry" would also cover an implementation of merely a processor (or multiple processors) or portion of a processor and its (or their) accompanying software and/or firmware. The term "circuitry" would also cover, for example, a radio frequency circuit, a baseband integrated circuit or applications processor integrated circuit for a mobile phone or a similar integrated circuit in a server, a cellular network device, or other network device.

Although specific examples of carrying out the disclosure have been described, those skilled in the art will appreciate that there are numerous variations and permutations of the above-described systems and methods that are contained within the spirit and scope of the disclosure. Any and all permutations, combinations, and sub-combinations of features described herein, including but not limited to features specifically recited in the claims, are within the scope of the disclosure.

What is claimed is:

1. A method comprising:
   receiving, by a central unit and from an element management system, one or more first messages indicating a power saving policy;
   determining, based on the one or more first messages, whether at least one power saving function applies to a distributed unit;
   determining an idle period; and
   after determining that the at least one power saving function applies to the distributed unit, sending, to the distributed unit and via a network connection, a second message indicating the idle period;
   wherein the second message comprises a common public radio interface common header, a common public radio interface extended header, and a real time control payload section indicating the idle period.

2. The method of claim 1, wherein the one or more first messages are one or more non-real time messages, and wherein the receiving the one or more first messages comprises receiving the one or more first messages via an interface between the central unit and the element management system.

3. The method of claim 1, wherein the second message is a real time message, and wherein the sending the second message comprises sending the second message via an interface between the central unit and the distributed unit.

4. The method of claim 3, wherein the interface between the central unit and the distributed unit comprises an e-common public radio interface.

5. The method of claim 1, wherein the power saving policy relates to at least one of: a time of day, a target user, a target area, or a key performance indicator.

6. The method of claim 1, wherein the power saving policy relates to at least one of: transmission power reduction, shutdown of transmission components, shutdown of reception components, shutdown of a cell, applying a certain beamforming mechanism, applying a certain cell usage, or applying a certain compression scheme.

7. An apparatus comprising:
one or more processors; and
non-transitory memory storing instructions that, when executed by the one or more processors, cause the apparatus to:
receive, from an element management system, one or more first messages indicating a power saving policy;
determine, based on the one or more first messages, whether at least one power saving function applies to a distributed unit;
determine an idle period; and
after determining that the at least one power saving function applies to the distributed unit, send, to the distributed unit and via a network connection, a second message indicating the idle period;
wherein the second message comprises a common public radio interface common header, a common public radio interface extended header, and a real time control payload section indicating the idle period.

8. The apparatus of claim 7, wherein the one or more first messages are one or more non-real time messages, and wherein the receiving the one or more first messages comprises receiving the one or more first messages via an interface between the apparatus and the element management system.

9. The apparatus of claim 7, wherein the second message is a real time message, and wherein the sending the second message comprises sending the second message via an interface between the apparatus and the distributed unit.

10. The apparatus of claim 9, wherein the interface between the apparatus and the distributed unit comprises an e-common public radio interface.

11. The apparatus of claim 7, wherein the power saving policy relates to at least one of: transmission power reduction, shutdown of transmission components, shutdown of reception components, shutdown of a cell, applying a certain beamforming mechanism, applying a certain cell usage, or applying a certain compression scheme.

12. The apparatus of claim 7, wherein the power saving policy comprises the at least one power saving function or at least one condition triggering the at least one power saving function.

13. The apparatus of claim 7, wherein the instructions, when executed by the one or more processors, further cause the apparatus to activate a power saving mode of the apparatus.

14. An apparatus comprising:
one or more processors; and
non-transitory memory storing instructions that, when executed by the one or more processors, cause the apparatus to:
receive, from a central unit and via a network connection, a first message indicating an idle period;
wherein the receiving the first message is based on:
the central unit receiving, from an element management system, one or more second messages indicating a power saving policy;
the central unit determining, based on the one or more second messages, whether at least one power saving function applies to the apparatus;
the central unit determining the idle period; and
after the central unit determining that the at least one power saving function applies to the apparatus; and
activate, based on the first message and for the idle period, a power saving mode of the apparatus;
wherein the first message comprises a common public radio interface common header, a common public radio interface extended header, and a real time control payload section indicating the idle period.

15. The apparatus of claim 14, wherein the activating the power saving mode of the apparatus comprises powering off downlink processing components of the apparatus or uplink processing components of the apparatus.

16. The apparatus of claim 15, wherein the downlink processing components or the uplink processing components comprise at least one of: radio frequency transmission components of the apparatus, radio frequency reception components of the apparatus, baseband processing components of the apparatus, or antenna components of the apparatus.

17. The apparatus of claim 14, wherein the activating the power saving mode of the apparatus comprises at least one of: modifying a beamforming mechanism, modifying a compression mechanism, or reducing transmission power of an output signal of the apparatus.

18. The apparatus of claim 14, wherein the first message is a real time message, and wherein the one or more second messages are one or more non-real time messages.

19. The apparatus of claim 14, wherein the receiving the first message comprises receiving the first message via an e-common public radio interface between the apparatus and the central unit.

* * * * *